Nov. 13, 1928.
B. GRANVILLE
1,691,280
METHOD OF MAKING POROUS MATERIAL
Filed July 26, 1926
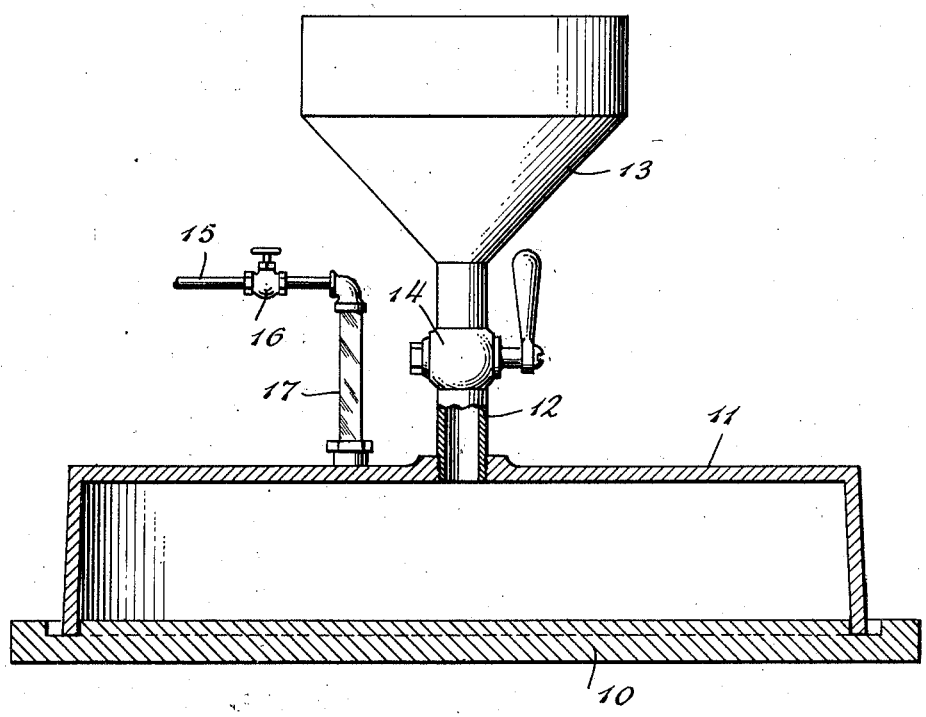
INVENTOR
Bernard Granville
BY
his ATTORNEY Patented Nov. 13, 1928.

1,691,280

UNITED STATES PATENT OFFICE.

BERNARD GRANVILLE, OF NEW YORK, N. Y.

METHOD OF MAKING POROUS MATERIAL.

Application filed July 26, 1926. Serial No. 124,938.

This invention relates to a method of making porous artificial stone and porous bodies of other material. Porous artificial stone has been made heretofore by mixing with hydraulic cement or a mixture of cement with a suitable aggregate a material which when water is added to the mass will generate gas within the mass and cause the mass to expand. Difficulties have been experienced in producing porous artificial stone in this way. If the mixture is too slow in setting, the expanded mass is likely to fall, or collapse, due to the escape of generated gas. On the other hand, if the material sets too quickly, the expansion may be stopped before the generation of gas and the desired expansion of the mass is completed. The present invention has been made especially with the idea of overcoming the difficulties heretofore met with in the production of porous artificial stone, and of providing an improved method of making porous solid bodies which is sure and certain in its results, which effects important savings in both material and time, and which has other important advantages over the methods heretofore known.

In accordance with the present invention, when producing porous artificial stone by the addition to cement or a mixture of cement and material such as cinders, kieselguhr or sand, of a substance or substances which when water is added to the cement or cement-containing material will cause the generation of gas within the semi-liquid mass, suction is applied to the wet mass during the generation of gas within the mass and the partial vacuum, or sub-atmospheric pressure, is maintained until the material has set. Some of the advantages of the method may be obtained by placing the moist or semi-liquid material in an open mold within a closed chamber, but most desirably, and to obtain all the benefits of the invention, the material is expanded within a closed mold, the amount of the wet material placed within the mold and the amount of gas generating material used being such that the expanded material will completely fill the mold.

The accompanying drawing shows a simple form of apparatus which may be employed for producing porous molded bodies in accordance with the invention.

The apparatus shown comprises a mold formed of a bottom 10 and an upper mold member 11 having a top and sides, the mold being of size and shape according to the size and shape of the body to be formed. Clamping means for clamping the upper mold member to the bottom board will not usually be required, since when the suction is applied the mold members will be pressed together by atmospheric pressure and the joint will be sealed by the material placed within the mold. The top wall of the mold has a filling opening to which is connected a filling pipe 12 carrying a hopper 13 and provided with a shut-off valve 14. A suction pipe 15 connects to a suction opening in the top wall of the mold, and this pipe leads to a suitable suction pump or other suction means and is provided with a shut-off valve 16.

In forming a molded body according to my method and with the apparatus shown, a charge of the wet material to be expanded is dumped into the hopper 13 and allowed to pass through the pipe 12 into the mold chamber, and the valve 14 is then closed. The amount of material placed in the mold will depend upon the degree of expansion desired, that is, if, for example, the material is to be doubled in volume, an amount of material will be placed in the mold which in this unexpanded state will half fill the mold. The material having been placed in the mold and the valve 14 closed, suction is applied to the material in the mold through the pipe 15, and is continued to maintain the desired partial vacuum, or sub-atmospheric pressure, within the mold during the time that gas is being generated in the material until the expanded material fills the mold. Under the sub-atmospheric pressure thus applied to the material within the mold, the rate at which the material expands is increased due both to the reduction of pressure on the material and to the increased rate of generation of the gas because of the lower pressure throughout the mass of material.

When the expanded material has filled the mold, the valve 16 is closed and the mold is then allowed to remain in that condition with the suction stopped but with the negative, or sub-atmospheric pressure maintained within the mold until the material has set. The valve 16 is then opened, and the upper mold member may then be lifted off. The molded block may be allowed to remain on the mold bottom 10 while hardening, or may be immediately transferred therefrom. The suction tube most desirably includes a section 17 of glass or other transparent material extending upward from the top of the mold to serve as an indicator for showing when the expanded material has filled the mold by the appearance of the material rising into this glass tube. The material when placed in the mold will usually and most desirably be wet to the degree of being in a semi-liquid condition, but may be merely sufficiently moist to expand uniformly and to form a strong coherent product.

An important advantage of my method is that much less of the gas generating material is required for producing expanded material of a given density than when the expansion is allowed to take place under atmospheric pressure. For example, in making blocks of expanded concrete containing equal parts by weight of hydraulic cement and cinders or kieselguhr or sand or other suitable fine aggregate, the amount of gas generating material such as fine ground metallic aluminum required to increase the bulk of the mixture 100% when operating according to my method with a partial vacuum of 16 inches is somewhat less than one-half of what is required when the material is allowed to expand at the normal atmospheric pressure. Another important advantage of my method is that because of the quicker rising of the material under a partial vacuum, a quicker setting material, or mixture, may be used, thus effecting an important saving in time. One way of securing the quicker setting is to use a lesser amount of water. As, for example, in a mixture containing one part of hydraulic cement and one part of cinders, instead of using one part of water by weight, I may use three-quarters of one part of water or less. Or a small amount of a suitable material for accelerating the setting, such as strontium sulphate or floated silica or aluminite cement, may be added to the mixture. Furthermore, by my method a product of any desired density may readily be obtained without exact proportioning of the amount of gas-generating material added to the mixture, since it is only necessary that sufficient gas-generating material be used to expand the amount or weight of material placed in the mold sufficiently to fill the mold, as the size of the molded block and the density of the molded material cannot be affected by the presence of additional gas-generating material in the mass. Molded blocks or bodies of the porous material of any desired size and weight may thus be readily produced, and all surfaces of the blocks or other bodies will be molded smooth or may be given other desired finish or surface formation by providing the mold with suitable molding surfaces. Also, the size of the holes or pores in the product, as well as the density or relative aggregate volume of the pores, may be readily controlled. The greater the amount of aluminum or other gas-generating material used of a certain degree of fineness, the smaller will be the holes in the product.

It should be noted that the application of suction to the material during the time that gas is being generated therein makes possible the molding of the expanded material in closed molds. If wet material is caused to expand in a closed mold by the use of a gas-generating substance therein without the application of suction to the mold, as in my method, the material after expanding to fill the mold will usually, if not in all cases, fall more or less before the material has set. This difficulty is entirely avoided by my method, and perfectly molded blocks or bodies are obtained without the necessity of exact proportioning of the ingredients of the mixture placed within the mold.

Porous bodies may be formed in accordance with my method of various materials having the property of setting to a solid state from a moist or semi-liquid state or condition, or of various mixtures containing such material. The invention is not limited to the use of quick setting materials, that is, materials which have a setting period corresponding to that of Portland or other quick setting hydraulic cement, although, of course, the shorter the setting period of the material used the greater will be the economy of operation.

As an example of the use of my method, for producing blocks of porous concrete, I may use a mixture of Portland or other hydraulic cement, cinders and water, with fine ground metallic aluminum as the gas-generating agent, in the proportions of 1 ton of cement, 1 ton of cinders, $\frac{3}{4}$ of a ton of water, and 2 pounds of aluminum. This mixture if subjected to a vacuum of 25 inches by the mercury gauge, will expand to double its volume. Without the application of pressure reduction to this mixture, at least four times the amount of aluminum would be required to cause it to expand to double its volume. The powdered aluminum is thoroughly mixed with the dry cement or with the dry mixture of cement and cinders, and the suction is applied to the mixture just after the water has been added and thoroughly mixed with the dry materials. Generation of gas commences immediately after the addition of water to the mixture, and the expansion will be completed usually in from 3 to 6 minutes after the suction is applied to the mixture. The use of warm water will quicken the gas generation. When Portland cement is used, it is desirable to add usually from 1 to 2% of free slaked lime for the purpose of increasing the alkalinity and obtaining a better reaction with the aluminum which will usually be more or less oxidized. Of course, various materials instead of cinders, such as sand and kieselguhr, may be mixed with the cement.

Any other suitable gas-generating material may also be used. For producing expanded cement or expanded concrete, for example, a powdered metallic calcium, powdered metallic barium or carbide of calcium or barium may be used, or two metals which in the presence of an alkali will result in the generation of gas may be used, such as an alloy of zinc and copper or an alloy of zinc and iron.

The term "porous" as applied to the product is not intended to imply that the product is permeable, since the holes or pores in the expanded mass will ordinarily be non-communicating or closed holes so that the porous body will be impermeable except for such degree of permeability as the solid walls of the material used may have.

What is claimed is:

1. The process of making porous solid material, which comprises subjecting wet gas-containing material which has the property of setting and hardening to a sub-atmospheric pressure and maintaining a sub-atmospheric pressure on the expanded material until it has set.

2. The process of making molded bodies of porous solid material, which comprises causing wet gas-containing material which has the property of setting and hardening to expand within and fill a closed mold by applying suction to the mold chamber, and maintaining a sub-atmospheric pressure in the mold chamber until the expanded material has set.

3. The process of making porous solid material, which comprises subjecting semi-liquid material which has the property of setting and hardening and which contains gas-generating material to a sub-atmospheric pressure during the generation of gas in the material and until the expanded material has set.

4. The process of making porous solid material, which comprises subjecting cementitious material in a wet condition and containing gas-generating material to a sub-atmospheric pressure during the generation of gas in the material and until the expanded material has set.

5. The process of making porous artificial stone, which comprises subjecting a wet mass containing a quick setting cement and gas-generating material to a sub-atmospheric pressure during the generation of gas in the mass.

6. The process of making porous artificial stone, which comprises subjecting a wet mass containing a quick setting cement and gas generating material to a sub-atmospheric pressure during the generation of gas in the mass and until the expanded material has set.

7. The process of making artificial stone, which comprises placing a wet mass containing a quick-setting cement and gas-generating material in a closed chamber, applying suction to the chamber during the generation of gas in the mass, and maintaining a sub-atmospheric pressure in the chamber until the material has set.

8. The process of making molded bodies of porous artificial stone, which comprises placing in a closed mold a quantity sufficient to only partially fill the mold of a wet mass containing a quick-setting cement and gas generating material, applying suction to the mold during the generation of gas whereby the material is caused to expand to fill the mold, and keeping the mold closed until the expanded material has set.

9. The process of making molded bodies of porous material, which comprises placing in a closed mold a quantity sufficient to only partially fill the mold of wet material which has the property of setting and hardening and which contains gas-generating material, applying suction to the mold during the generation of gas whereby the material is caused to expand to fill the mold, and keeping the mold closed until the expanded material has set.

In testimony whereof I have hereunto set my hand.

BERNARD GRANVILLE.